(12) United States Patent
Levy et al.

(10) Patent No.: US 7,740,781 B2
(45) Date of Patent: Jun. 22, 2010

(54) PASTE EXTRUDED INSULATOR WITH AIR CHANNELS

(75) Inventors: Daniel L. Levy, Tannay (CH); Kurt Aeschbach, Carouge (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 381 days.

(21) Appl. No.: 11/524,115

(22) Filed: Sep. 20, 2006

(65) Prior Publication Data

US 2007/0012467 A1 Jan. 18, 2007

Related U.S. Application Data

(63) Continuation of application No. 10/981,061, filed on Nov. 4, 2004, now abandoned.

(60) Provisional application No. 60/533,540, filed on Dec. 31, 2003.

(51) Int. Cl.
*H01B 9/06* (2006.01)

(52) U.S. Cl. .................... 264/171.14; 264/127

(58) Field of Classification Search ............ 264/171.14, 264/127
See application file for complete search history.

(56) References Cited

U.S. PATENT DOCUMENTS

| 2,685,707 A | 8/1954 | Llewellyn et al. |
| 3,771,934 A | 11/1973 | Delves-Broughton |
| 4,529,564 A * | 7/1985 | Harlow ..................... 264/127 |
| 5,518,676 A | 5/1996 | De Rocheprise |
| 5,731,394 A * | 3/1998 | Treat et al. .................. 526/247 |
| 5,789,711 A | 8/1998 | Gaeris et al. |
| 5,920,032 A | 7/1999 | Aeschbacher et al. |
| 5,922,155 A | 7/1999 | Clouet et al. |
| 5,965,074 A | 10/1999 | Aubertin et al. |
| 5,969,295 A | 10/1999 | Boucino et al. |
| 6,000,927 A | 12/1999 | Prenzel et al. |
| 6,091,025 A | 7/2000 | Cotter et al. |
| 6,174,473 B1 * | 1/2001 | Levy et al. .................. 264/127 |
| 6,303,867 B1 | 10/2001 | Clark et al. |
| 6,639,152 B2 | 10/2003 | Glew et al. |
| 6,780,360 B2 * | 8/2004 | Lange et al. ................. 264/127 |
| 2003/0094727 A1 * | 5/2003 | Lange et al. ................. 264/127 |
| 2005/0230145 A1 | 10/2005 | Ishii et al. |
| 2006/0118322 A1 * | 6/2006 | Wiekhorst et al. ...... 174/110 R |

* cited by examiner

*Primary Examiner*—Joseph S Del Sole
*Assistant Examiner*—Kimberly A Stewart

(57) ABSTRACT

The invention provides an insulated wire having a conductor and an insulator of paste extruded PTFE fine powder around the conductor. The paste extruded insulator has at least one closed continuous longitudinal air channel spaced apart from the conductor. The invention further provides a process for forming an insulator around a conductor by paste extruding lubricated PTFE fine powder in an extrusion device comprising a die, mandrel, and at least one channel-forming member. The die and mandrel form a converging chamber leading to an extrusion orifice and the channel-forming member is positioned in the orifice. The mandrel has a central bore for supplying the conductor. Lubricated PTFE fine powder is forced through the chamber and out of the exit of the orifice as a lubricated green extrudate around the conductor forming an insulator with at least one closed longitudinal air channel spaced apart from the conductor.

12 Claims, 4 Drawing Sheets

PASTE EXTRUDED INSULATOR WITH AIR CHANNELS

FIELD OF THE INVENTION

This invention relates to an insulated wire and a method for manufacturing it by paste extruding an insulator of polytetrafluoroethylene.

BACKGROUND OF THE INVENTION

Polytetrafluoroethylene (PTFE) fine powder has been used for many years as a wire insulator. However, despite the desirable properties of high molecular weight PTFE, namely low dielectric constant and low dissipation factor, other polymers have been used in forming insulation for wires, especially in large diameter, high frequency coaxial transmission cable because of the processing limitations of PTFE.

Polytetrafluoroethylene (PTFE) fine powder is a type of PTFE that is made by aqueous dispersion polymerization, followed by coagulation of the dispersion and drying of the resultant coagulated solids to obtain the fine powder. Because the PTFE fine powder does not flow in the melt condition sufficiently to enable melt processing, the powder has been fabricated into articles and coated onto wire by an extrusion method which does not require melt flow. This extrusion method is known as paste extrusion and is described for example in U.S. Pat. No. 2,685,707. In paste extrusion, a paste extrusion composition is formed by mixing PTFE fine powder with an organic lubricant which has a viscosity of at least 0.45 centipoise at 25° C. and is liquid under the conditions of subsequent extrusion. The PTFE soaks up the lubricant, resulting in a dry, pressure coalescing paste extrusion composition that is also referred to as lubricated PTFE fine powder. During paste extrusion which is typically performed at a temperature of 20 to 60° C., the lubricated fine powder is forced through a die to form a lubricated green extrudate. The lubricated green extrudate is then heated, usually at a temperature of 100 to 250° C., to make volatile and drive off the lubricant from the extrudate. In most cases, the dried extrudate is heated to a temperature close to or above the melting point of the PTFE, typically between 327° C. and 500° C., to sinter the PTFE.

Cables capable of transmitting high frequency electromagnetic radiation are especially useful for communications in the radio bandwidth in areas where structures may inhibit signal transmission, such as in or around buildings, tunnels, or garages. Likewise, such cables also have use in unobstructed areas, but where there is a need for precisely controlled signal levels that must be distributed over distances without the interference of other nearby signals.

High frequency transmission cable requires insulation with the lowest possible dielectric constant $\in_r$ and the lowest possible dissipation factor tan δ to obtain the desired attenuation characteristics. As disclosed in U.S. Pat. No. 5,922,155, a dielectric constant of less than about 1.8 is desirable. Insulation material such as fluoropolymers and polyethylene have dielectric constants close to about 2. As taught in U.S. Pat. Nos. 3,771,934 and 5,922,155, air cells can be introduced into insulation made of melt-flowable polymers to reduce the dielectric constant.

PTFE has the lowest loss (dissipation factor) of most commonly used polymers. So while other polymers such as polyethylene or melt-flowable fluoropolymers, e.g., PFA [TFE/perfluoro(alkyl vinyl ether) copolymer] and FEP (TFE/hexafluoropropylene copolymer), are easier to form by using melt extrusion techniques, their loss is not as low as PTFE. For example, at a frequency of 1 MHz, the dissipation factor of PTFE is more than two times lower than PFA and more than three times lower than polyethylene or FEP. Nonetheless, PTFE has been difficult to form into large diameter insulators for wire because of difficulties in drying the green extrudate to remove the lubricant from thick structures of paste extruded PTFE fine powder. Large diameter PTFE insulators have also been expensive because of the quantity of PTFE fine powder required.

Another significant requirement for high frequency communication cable is noncombustibility that fluoropolymers can provide but structures of polyethylene, polypropylene or polyvinyl chloride cannot. PTFE has the highest stability to heat among the fluoropolymers.

An insulated wire of paste extruded PTFE with lower dielectric constant, with lower dissipation factor and which requires a smaller quantity of PTFE fine powder for its manufacture would be highly desirable for use in high frequency cables.

BRIEF SUMMARY OF THE INVENTION

The invention provides an insulated wire having a conductor and an insulator of paste extruded PTFE fine powder around the conductor. The paste extruded insulator has at least one closed continuous longitudinal air channel spaced apart from the conductor. Preferably the insulator is dried and then sintered. In a preferred embodiment, the insulated wire is part of a coaxial cable.

The invention further provides a process for forming an insulator around a conductor by paste extruding lubricated PTFE fine powder in an extrusion device comprising a die, mandrel, and at least one channel-forming member. The die and mandrel form a converging chamber leading to an extrusion orifice and the channel-forming member is positioned in the orifice. The mandrel has a central bore for supplying the conductor. Lubricated PTFE fine powder is forced through the chamber and out of the exit of the orifice as a lubricated green extrudate around the conductor forming an insulator with at least one closed longitudinal air channel spaced apart from the conductor.

In one preferred embodiment, the channel forming-member is supported upstream of the orifice. In another preferred embodiment, the extrusion device has multiple channel-forming members which form multiple closed longitudinal channels spaced apart from each other. In a more preferred embodiment, the lubricated PTFE fine powder is forced around the channel-forming member into a space between the conductor and the channel forming member pressure coalescing the lubricated PTFE fine powder into the lubricated green extrudate around the conductor. Preferably, the extrusion device has a high shear region formed at the juncture of the chamber and the orifice which causes substantial fibrillation and the pressure coalescing is performed upstream of the high shear region. Preferably, the lubricated green extrudate is dried and, most preferably, gas is circulated though the air channel of the lubricated green extrudate to facilitate lubricant removal during drying. For most applications, it is also preferred to sinter the dried green extrudate.

DETAILED DESCRIPTION OF THE INVENTION

This invention relates to a process for paste extruding lubricated PTFE fine powder around a conductor forming an insulator having at least one closed continuous longitudinal air channel spaced apart from the conductor. Air channels in the insulator provide a means for aiding the removal of volatilized lubricant from the green extrudate during manufacture and for reducing the dielectric constant of the sintered product which is especially useful for high frequency communication cables.

Figure 1:
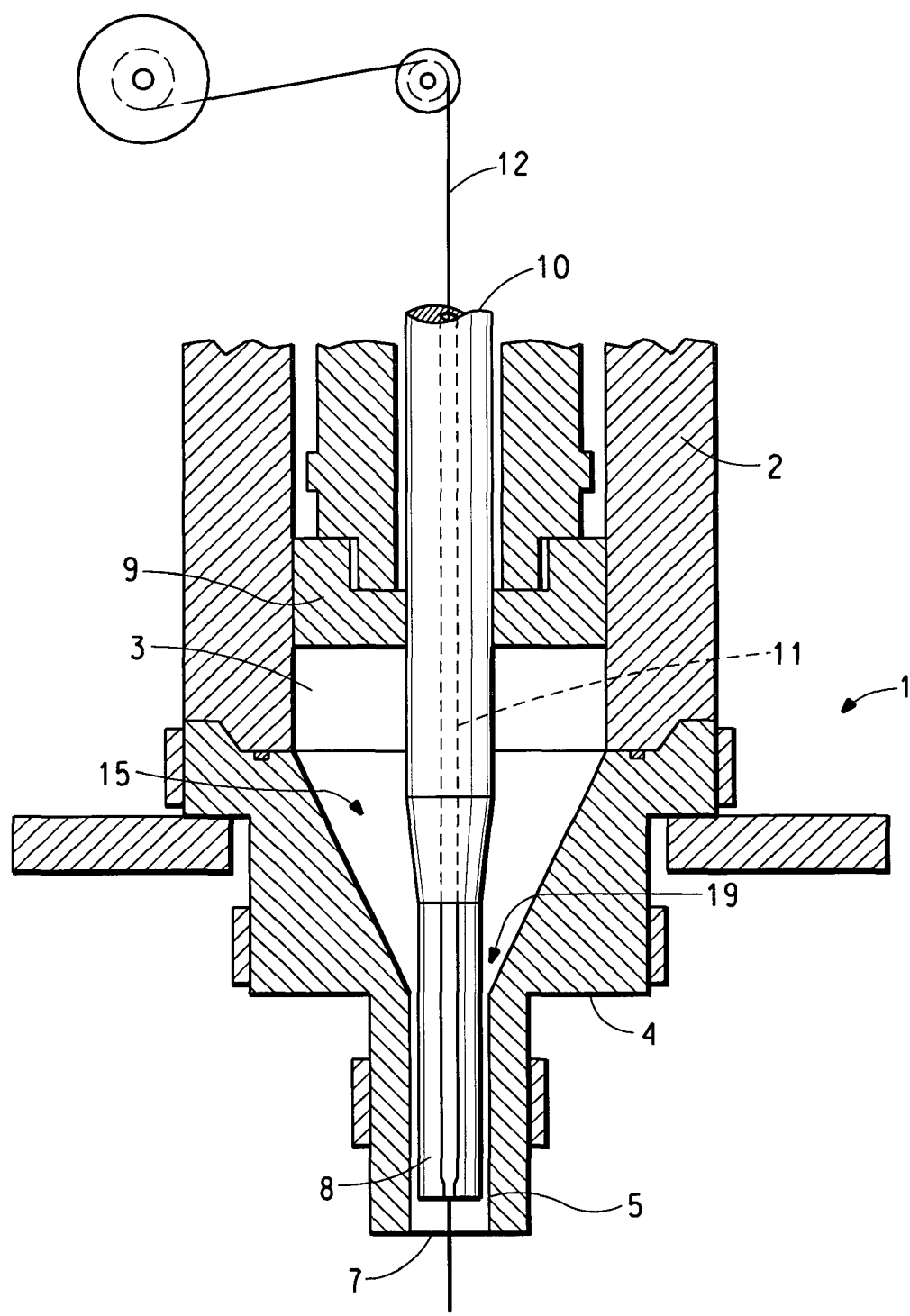
FIG. 1 is a partial longitudinal cross-section of the extrusion device used in this invention.

The process of paste extrusion of lubricated PTFE fine powder may be understood with reference to FIG. 1 wherein there is shown an extrusion device 1 having a barrel 2 and a die 4. Inside device 1 there is defined a chamber 3 for supplying lubricated PTFE which leads to extrusion orifice 5. Positioned within the chamber is mandrel 10 for shaping the PTFE and positioned within orifice 5 is at least one channel-forming member 8. The die and the mandrel cause chamber 3 to converge in the area designated as convergence zone 15. Channel-forming member 8 is supported by extrusion device 1, preferably upstream of the orifice 5, and is most preferably supported by the mandrel 10. Preferably, channel-forming member 8 is recessed in orifice 5 upstream of exit 7 of the orifice. Mandrel 10 has a central bore 11 for supplying conductor 12. Conductor 12 can be either a single strand or a multi-strand wire. Further as illustrated in FIG. 1, the convergence zone has a high shear region 19 at the juncture of chamber 3 and orifice 5.

Lubricated PTFE fine powder, usually as a charge shaped under pressure to conform to chamber 3, is placed in chamber 3 and is then paste extruded by a ram 9 positioned in chamber 3 at the end opposite extrusion orifice 5 which moves toward extrusion orifice 5 to force the lubricated PTFE fine powder through extrusion orifice 5 and out orifice exit 7 around conductor 12. Preferably, the mandrel 10 and channel-forming member 8 are positioned so that the lubricated PTFE fine powder is forced around channel-forming 8 member and into a space between conductor 12 and channel-forming member 8 and is subjected to pressure coalescing in convergence zone 15, preferably upstream of high shear region 19, forming a lubricated green extrudate around the conductor.

Lubricated PTFE fine powder comprises PTFE primary particles which, during paste extrusion, are deformed into small interconnected fiber-like structures, called fibrils and thus the fine powder is said to fibrillate. The lubricated PTFE fine powder is fibrillated by shear forces as it is forced through the extrusion device 1. Substantial fibrillation occurs in high shear region 19 at the juncture of the chamber 3 and the orifice area 5 between channel forming member 8 and the walls of orifice 5. These fibrils are primarily oriented in the direction of the paste extrusion which means that after extrusion, the lubricated extrudate is especially strong in the extrusion direction. In the preferred process of this invention the lubricated PTFE fine powder is pressure coalesced around the conductor 12 prior to substantial fibrillation in the high shear zone 19. Premature fibrillation can hinder adherence of the extrudate to the conductor and can create areas of weakness in the extrudate due to poor knitting of polymer in those areas.

It is further preferred that the speed at which the conductor is supplied approximates the speed of the lubricated PTFE as it is being forced through the orifice, again insuring better adhesion of the insulator to the conductor.

Figure 2:
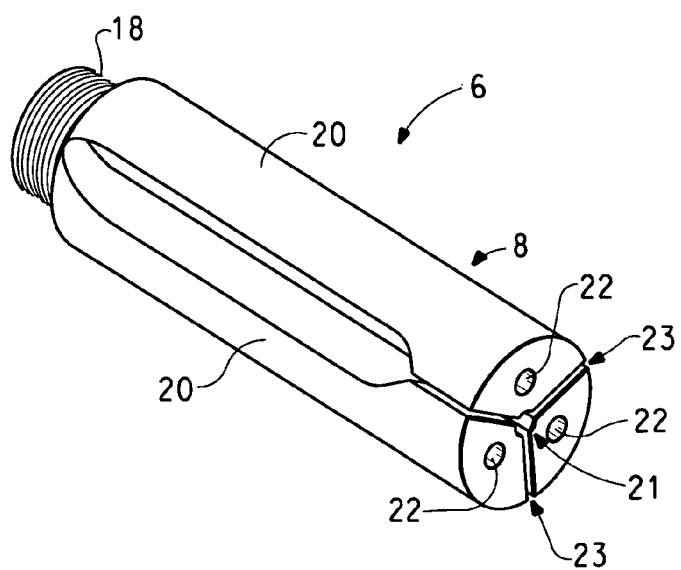
FIG. 2 is an enlarged perspective view of one embodiment of a mandrel tip employed in the extrusion device of FIG. 1.

One embodiment of channel-forming member 8 used in this invention is illustrated in FIG. 1 and may be seen in perspective in FIG. 2. In FIG. 2, the channel-forming member 8 is provided by a mandrel tip 6 which includes a connector element 18, such as a threaded connection for attachment to the mandrel 10, which supports the channel-forming member 8 positioned in orifice 5. As illustrated, the mandrel tip 6 of this embodiment can be described as a cylinder with three radial spaces 23 dividing the cylinder into three pie-shaped segments 20 serving as channel-forming members. The radial spaces 23 are larger upstream but taper to a smaller size near the exit 7 or the orifice 5. The mandrel tip 6 also includes and a central space 21 for accommodating conductor 12 (not shown) being fed from mandrel bore 11. Each pie-shaped segment has a bore 22 running the length of the mandrel tip 6 to provide fluid communication with mandrel bore 11 through which a vacuum is drawn or, alternatively, air is pumped during extrusion to aid in removing lubricant during drying as will be described in more detail hereinafter.

Figure 3:
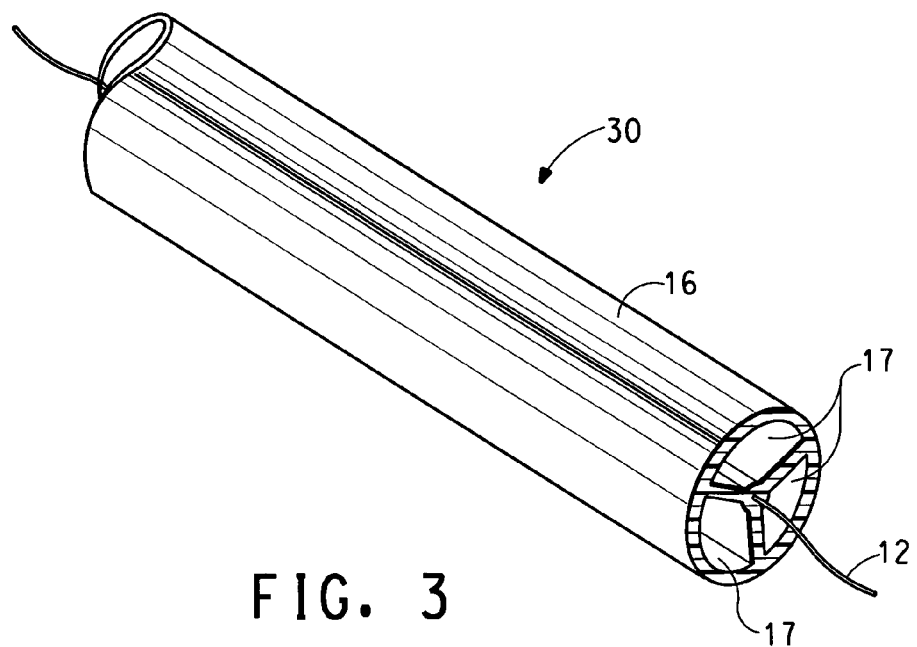
FIG. 3 is a partial perspective view of an insulator formed using the mandrel tip illustrated in FIG. 2.

The insulated wire 30 shown in FIG. 3 having a conductor 12 and an insulator 16 of paste extruded PTFE, is formed using extrusion device 1 with the mandrel tip 6 shown in FIG. 2. The insulator has multiple closed continuous longitudinal air channels 17 spaced from each other and are disposed symmetrically about the conductor. The insulator 16 is formed as the lubricated PTFE fine powder is forced around the pie shaped segments 20 of mandrel tip 6 and into the space between the conductor and the mandrel tip forming three pie-shaped closed continuous longitudinal air channels 17 spaced apart from the conductor 12. Pressure coalescence of the extrudate occurs preferably as the PTFE passes through the radial spaces 23 to the central space 21 and then enters the space between the conductor and the channel-forming member upstream of the high shear region 19 shown in FIG. 1.

Figure 4:
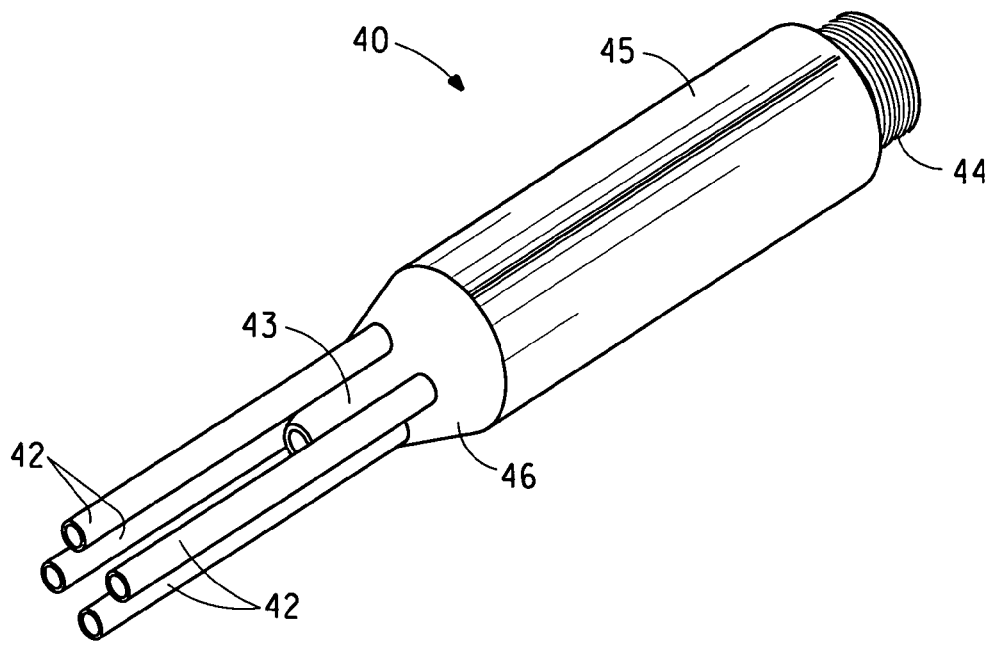
FIG. 4 is an enlarged perspective view of a second embodiment of a mandrel tip for use in the extrusion device of FIG. 1.

An alternative embodiment of the mandrel tip 40 for use in this invention is illustrated in perspective in FIG. 4. This mandrel tip 40 also has a connector element 44 connecting to a mandrel tip body 45 with a tapering end 46. The channel forming members of mandrel tip 40 is comprised of four tubes 42 symmetrically spaced around central tube 43 for accommodating a conductor (not shown) being fed from the mandrel bore 11. The four tubes 42 and central tube 43 extend from the tapering end 46 of the mandrel tip body 45 with the central tube extending a shorter distance from the tapering end 46 of the mandrel tip body 45 than the tubes 42. The mandrel tip body 46 has appropriate passages (no shown) so that the four tubes 42 are in fluid communication with the mandrel bore 11 so that, during extrusion, a vacuum can be drawn through the tubes, or alternatively air is forced in the tubes, to aid in removing lubricant during drying as will be described in more detail hereinafter.

Figure 5:
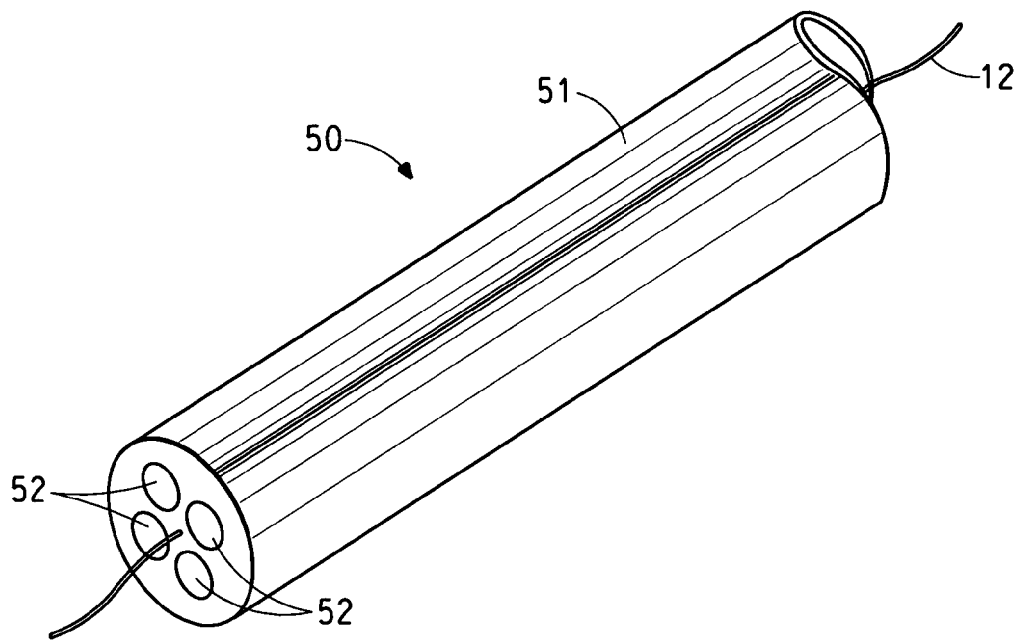
FIG. 5 is a partial perspective view of an insulator formed using the mandrel tip illustrated in FIG. 4.

The insulated wire 50 shown in FIG. 5 having a conductor 12 and an insulator 51 of paste extruded PTFE, is formed using an extrusion device with the mandrel tip shown in FIG. 4. The insulator has multiple closed continuous longitudinal air channels spaced from each other and are disposed symmetrically about the conductor. The insulator 51 is formed as the lubricated PTFE fine powder is forced around the tubes of the channel-forming member and into the space between the conductor and the tubes forming an insulator 51 with four circular closed continuous longitudinal air channels 52 spaced apart from the conductor 12. Pressure coalescence of the extrudate occurs preferably as the PTFE enters the space between the conductor and the tubular channel-forming member upstream of the high shear region of the extrusion device.

Paste extrusion in accordance with the process of the invention is preferably carried out at a temperature of 20 to 60° C., though extrusion temperatures outside this range can also be used. The lubricated green extrudate is then heated, usually at a temperature of 100 to 250° C., to volatilize and drive the lubricant from the extrudate, drying the extrudate. In accordance with a preferred form of the invention, a gas suitable for carrying the volatilized lubricant, e.g., air, is circulated through the air channels of the extrudate during drying. This is advantageously accomplished by introducing gas, or alternatively, applying a vacuum to the mandrel bore 11 which causes gas flow though the bores 22 in mandrel tip 6 depicted in FIG. 2 or the tubes 42 in mandrel tip 40 depicted in FIG. 4. This gas flow causes gas flow though the newly-formed air channels in the green extrudate and the flow is continued though the portion of the extrudate being dried. The gas flows continue to the end of the extrudate where the air channels operate as vents, either to vent gas (and volatilized lubricant) being pumped or to admit gas being drawn into the insulator. Drying times are shortened substantially by the gas flow through the extrudate being dried. Previously, the drying step limited the size of articles that could be made from high molecular weight PTFE in commercially viable processes. Prior to this invention, only coated wire with small diameter insulators could be made using PTFE because large diameter insulators would have thick walls hindering the volatilization of the lubricant. With this invention however, longitudinal air channels and a reduced mass of PTFE facilitate lubricant extraction permitting the formation of large diameter cables from high molecular weight PTFE.

Insulated wire having a wide range of diameters, e.g., about 2 mm to about 125 mm, can be made using the process in accordance with the invention. The invention is advantageously employed to make insulated wire with diameters greater than about 8 mm, more preferably greater than 10 mm, even more preferably greater then about 15 mm, and most preferably, greater than about 20 mm. An especially preferred range is about 10 mm to about 50 mm. Such large diameters can be made economically though use of the invention due to the decreased drying times.

After drying, most applications the extrudate is preferably sintered in an oven by heating to temperature between 327° C. and 500° C. for a period sufficient to strengthen the insulator around the wire.

Figure 6:
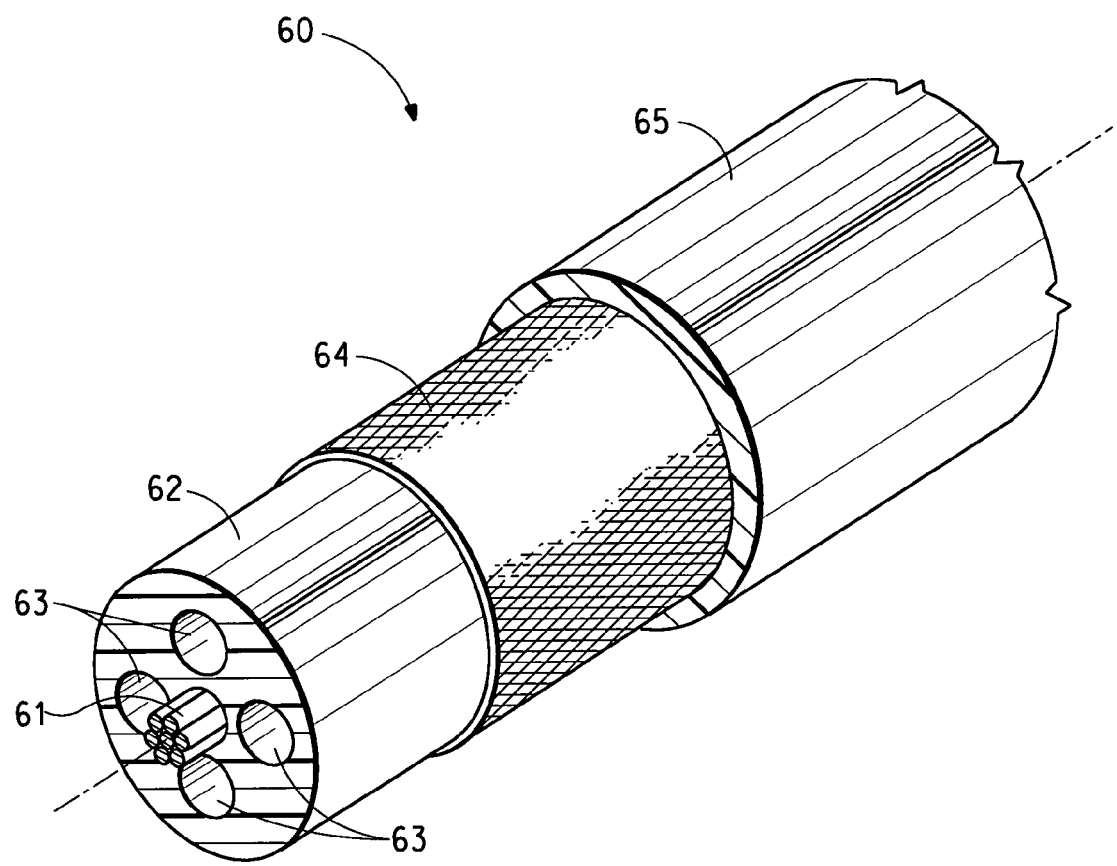
FIG. 6 is a partial perspective cut away view of a coaxial cable with insulated wire having an insulator and longitudinal air channels made according to this invention.

The invention further provides a coaxial cable with the insulated wire made by the process the described above. A coaxial cable generally includes an inner conductor, an outer conductor concentrically arranged around the inner conductor, an insulator made of paste extruded PTFE between the conductors and an outer protective sheath. FIG. 6 illustrates a coaxial cable 60 having an insulated wire made using the extrusion device of FIG. 1 and the mandrel tip 40 described in FIG. 4. Shown is a central core of a plurality of stranded conductor wires 61, an insulator 62 of paste extruded PTFE fine powder around the conductor wires having four closed continuous longitudinal tubular air channels 63 spaced apart from the conductor. Around insulator 62 is a braided or woven outer conductor 64 and a protective outer sheath 65.

In order to obtain the attenuation at high frequencies required by coaxial cables, the dielectric insulator is should have a dielectric constant as close to 1 as possible. Fluoropolymers are known for their low dielectric constants. The dielectric constant of unsintered PTFE is about 1.7 and that of sintered PTFE is about 2. The incorporation of air channels in the insulator reduces the dielectric constant to useful ranges for coaxial cables transmitting high frequency electromagnetic radiation.

Further, PTFE has the lowest loss (dissipation factor) of most commonly used polymers. So while other polymers such as polyethylene or melt-flowable fluoropolymers, e.g., PFA [TFE/perfluoro(alkyl vinyl ether) copolymer] and FEP (TFE/hexafluoropropylene copolymer), are easier to form by using melt extrusion techniques, their loss is not as low as PTFE. For example, at a frequency of 1 MHz, the dissipation factor of PTFE is More than two times lower than PFA and more than three times lower than polyethylene or FEP. The process of the present invention makes it possible to take advantage of the desirable properties of PTFE fine powder, i.e., low dielectric constant and low loss and form PTFE into insulation for large diameter high frequency cable. Further, the high heat stability of PTFE makes this fluoropolymer more desirable than other commonly used polymers.

What is claimed is:

1. A process for forming an insulator around a conductor comprising:

paste extruding lubricated PTFE fine powder in an extrusion device comprising a die, mandrel, and at least one channel-forming member, said die and mandrel forming a converging chamber leading to an extrusion orifice with said channel-forming member positioned in said orifice, said mandrel having a central bore for supplying said conductor, said paste extruding comprising forcing lubricated PTFE fine powder through said chamber and out of the exit of said orifice as a lubricated green extrudate around said conductor forming an insulator with at least one closed longitudinal air channel spaced apart from said conductor, wherein said lubricated PTFE fine powder is forced around said channel-forming member and into a space between said conductor and said channel-forming member pressure coalescing said lubricated PTFE fine powder into said green extrudate around said conductor, said extrusion device having a high shear region which causes substantial fibrillation of said lubricated PTFE, and said pressure coalescing being performed upstream of said high shear region.

2. The process of claim 1 wherein said channel-forming member is supported by the extrusion device upstream of said orifice.

3. The process of claim 1 further comprising the step of drying the lubricated green extrudate.

4. The process of claim 3 further comprising the step of sintering the dried extrudate.

5. The process of claim 1 wherein said extrusion device has multiple channel-forming members which form multiple closed longitudinal air channels spaced from each other.

6. The process of claim 5 wherein said multiple channel-forming members are disposed symmetrically in said orifice about said conductor.

7. The process of claim 1 wherein said high shear region is at the juncture of said chamber and said orifice.

8. The process of claim 7 wherein said channel-forming member is supported by the extrusion device upstream of said high shear region.

9. The process of claim 1 wherein said supplying of said conductor is performed at a speed approximating the speed of said lubricated PTFE fine powder being forced through said orifice.

10. The process of claim 1 wherein said insulator has a diameter of greater that about 8 mm.

11. The process of claim 1 wherein said insulator has a diameter of greater than about 10 mm.

12. The process of claim 3 further comprising circulating gas through said longitudinal air channel in the lubricated green extrudate during said drying.

* * * * *